(12) United States Patent
McClurkan

(10) Patent No.: US 7,701,086 B2
(45) Date of Patent: Apr. 20, 2010

(54) REMOTE CONTROLLED EXTENSION CORD WITH EMBEDDED HOUSING FOR A REMOTE CONTROL

(76) Inventor: Mike McClurkan, 2707 Nix La., Jonesboro, AR (US) 72404

( * ) Notice: Subject to any disclaimer, the term of this patent is extended or adjusted under 35 U.S.C. 154(b) by 0 days.

(21) Appl. No.: 12/100,413

(22) Filed: Apr. 10, 2008

(65) Prior Publication Data

US 2009/0256424 A1    Oct. 15, 2009

(51) Int. Cl.
*H02J 3/14* (2006.01)
(52) U.S. Cl. ............................ 307/38; 307/42; 307/116; 439/189; 439/502
(58) Field of Classification Search ............. D13/139.8; 439/501, 189, 502; 307/38, 42, 116
See application file for complete search history.

(56) References Cited

U.S. PATENT DOCUMENTS

| | | | |
|---|---|---|---|
| 2,979,624 A * | 4/1961 | Askerneese | 307/38 |
| 4,153,860 A | 5/1979 | Vonick | |
| 5,103,380 A | 4/1992 | Linder | |
| 5,236,374 A * | 8/1993 | Leonard et al. | 439/505 |
| D411,169 S | 6/1999 | West | |
| 6,037,679 A | 3/2000 | Pirillo | |
| 6,211,581 B1 | 4/2001 | Farrant | |
| 6,320,327 B1 | 11/2001 | Lavatelli | |
| 6,655,817 B2 | 12/2003 | Devlin | |
| 6,666,712 B1 | 12/2003 | Kramer | |
| 7,210,960 B2 * | 5/2007 | Mak et al. | 439/505 |
| 2001/0030862 A1 | 10/2001 | Simms | |
| 2002/0167696 A1 * | 11/2002 | Edwards et al. | 359/142 |
| 2003/0107888 A1 | 6/2003 | Devlin | |
| 2004/0056535 A1 * | 3/2004 | Hussaini et al. | 307/112 |
| 2005/0128756 A1 | 6/2005 | Prine | |
| 2005/0192069 A1 * | 9/2005 | Vanselous | 455/575.9 |

FOREIGN PATENT DOCUMENTS

| | | | |
|---|---|---|---|
| EP | 1653572 A1 * | 5/2006 | |
| WO | WO 2004043109 A1 * | 5/2004 | |
| WO | WO 2007064118 A1 * | 6/2007 | |

* cited by examiner

*Primary Examiner*—Albert W Paladini
*Assistant Examiner*—Daniel Cavallari
(74) *Attorney, Agent, or Firm*—Muskin & Cusick LLC

(57) ABSTRACT

A remote controlled extension cord. The extension cord has a wire attached to a plug with an integrated base. The base serves to cradle a remote control, which is used to turn power on/off to the extensions on the cord. The remote control can snap inside the base and can be easily pushed out. The base thereby serves as a convenient storage for the remote control in order to discourage the remote from getting misplaced.

5 Claims, 4 Drawing Sheets

REMOTE CONTROLLED EXTENSION CORD WITH EMBEDDED HOUSING FOR A REMOTE CONTROL

BACKGROUND OF THE INVENTION

1. Field of the Invention

The present inventive concept relates to an extension cord with an integrated remote control.

2. Description of the Related Art

Remote control power cords are known in the art. For example, see West, U.S. Pat. No. D411,169. One disadvantage to this type of device is that it may be easy for the user to lose the remote control.

What is needed is a remote control extension cord which has a mechanism to discourage the loss of the remote unit.

SUMMARY OF THE INVENTION

It is an aspect of the present general inventive concept to provide an improved remote control extension cord.

The above aspects can be obtained by an apparatus that includes (a) a plug connected to a first end of a cord; (b) a base attached to an intermediate portion of the cord, the base comprising a housing unit adapted to removably receive a remote control; and (c) a plurality of extension sockets attached to a second end of the cord; (d) wherein the remote control controls power to the plurality of extension sockets.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1A:
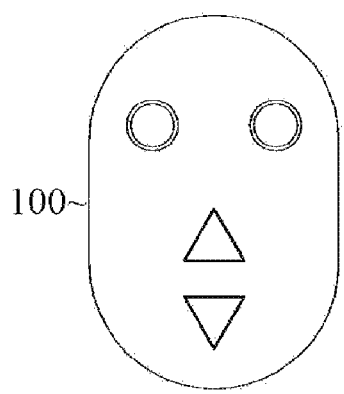
FIG. 1A is a top view of a remote control.

Reference will now be made in detail to the presently preferred embodiments of the invention, examples of which are illustrated in the accompanying drawings, wherein like reference numerals refer to like elements throughout.

Embodiments of the invention relate to an extension cord which is operated by a remote control, and a housing attached to the extension cord which is used to house the remote control. By locating the housing on the extension cord itself, and adapting the housing to securely, but removably, receive the remote control, a user would be less likely to lose the remote control.

FIG. 1A is a top view of a remote control.

A remote control unit 100 is used to turn on/off power to sockets 108 (not pictured in FIG. 1A).

Figure 1B:
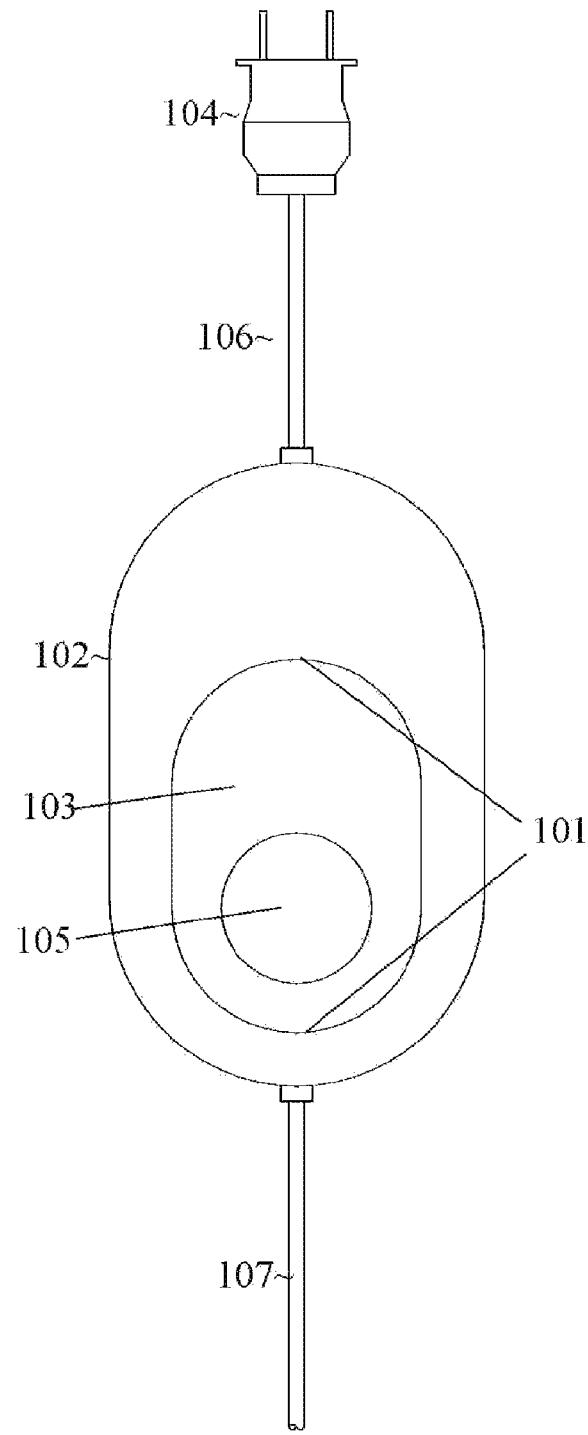
FIG. 1B is a top view of the extension cord.

FIG. 1B is a top view of the extension cord.

A plug 104 is plugged into an electrical outlet (not pictured), typically located on a wall. A first section of a power cord 106 connects the plug 104 to a base 102. The base 102 is used to house the remote control unit 100. The base comprises a hollow portion 101 inside the base which is sized to receive the remote control unit 100. The hollow portion 101 also comprises a housing floor 103, which is a surface that is recessed below an outer surface of the base 102. When the remote control unit 100 is inserted into the hollow portion 101, the remote control unit 100 will rest on the housing floor 103.

The hollow portion 101 comprises a hole 105 which can be used by an operator to dislodge the remote control unit 100 when the remote control unit 100 is secured inside the base 102. This can be done by the operator pressing his or her finger through the hole 105, thereby pushing the remote control unit 100 out of the base 102.

A second section of the power cord 107 connects the base 102 to the sockets 108 (not pictured in FIG. 1B). The first section of the power cord 106 and the second section of the power cord 107 are typically part of the same cord and there is no interruption of the cord or the conductive material throughout the cord. The cord passes through, or under, the base 102.

Figure 2:
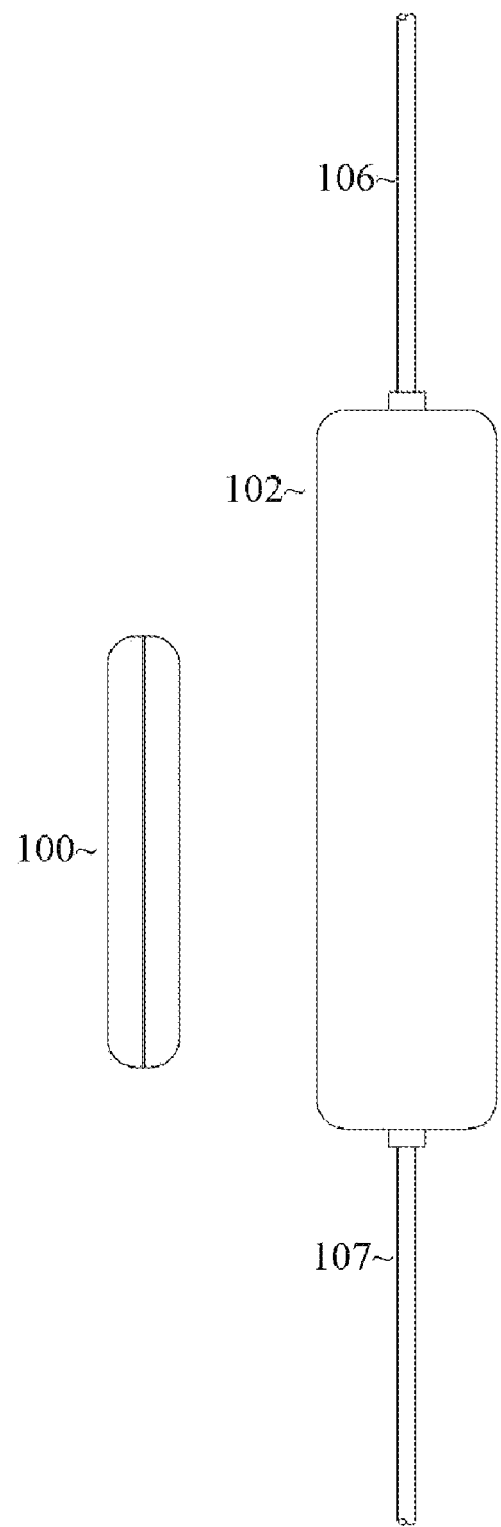
FIG. 2 is a side view of the remote control and extension cord.

FIG. 2 is a side view of the remote control and extension cord.

A remote control unit 100 is pictured alongside a base 102. The base is connected to a cord which has a first section 106 and a second section 107.

Figure 3:
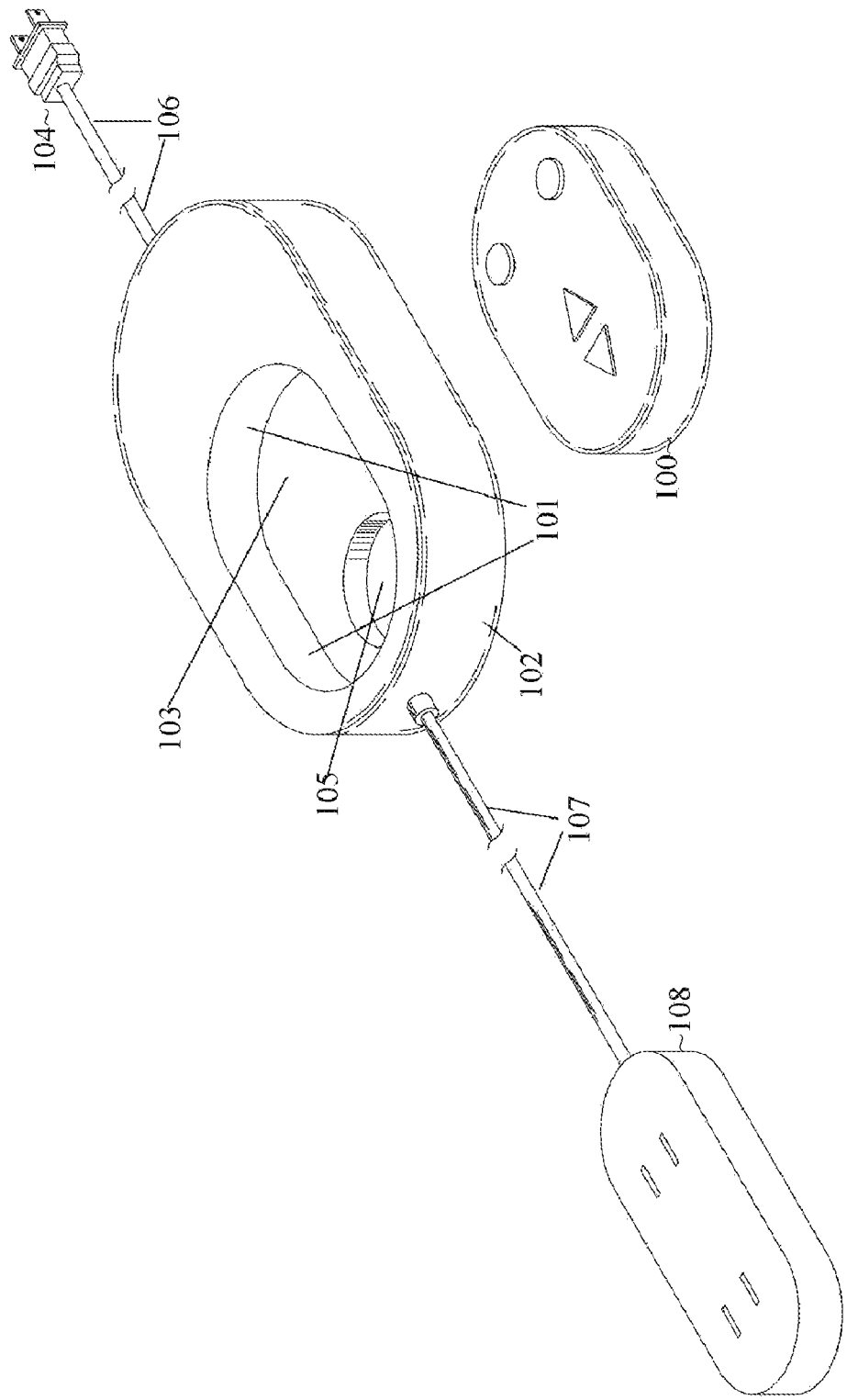
FIG. 3 is an orthogonal view of the remote control outside of the extension cord.

FIG. 3 is an orthogonal view of the remote control outside of the extension cord.

The base 102 comprises a hollow portion 101 which comprises a hole 105. The base is attached to first section of a cord 106 which is attached to a plug 104. The base 102 is also attached to a second section of a cord 107 which is in turn connected to sockets 108. The hollow portion 101 is the ovular portion which is really not a physical structure at all since it is a hollow portion. On the bottom of the hollow portion 101 is the housing floor 103, which the remote control unit 100 rests on when the remote control unit 100 is secured inside the base (see FIG. 4).

The remote control unit 100 is used to turn power on and off to the sockets. The remote control unit 100 can turn all of the sockets 108 on or off. Alternatively, the remote control unit 100 can be used to turn individual sockets on and off.

The remote control unit 100 would typically comprise an internal battery (not pictured) and a transmitter, as known in the art. The base 102 can comprise a battery (or other power source) to power a receiver (not pictured) which would detect a signal from the remote control unit 100.

Illustrated is the remote control unit 100 separated from the base 102. In this configuration, the user is free to walk around the room and operate the unit (e.g., turn power to the socket(s) on/off).

Figure 4:
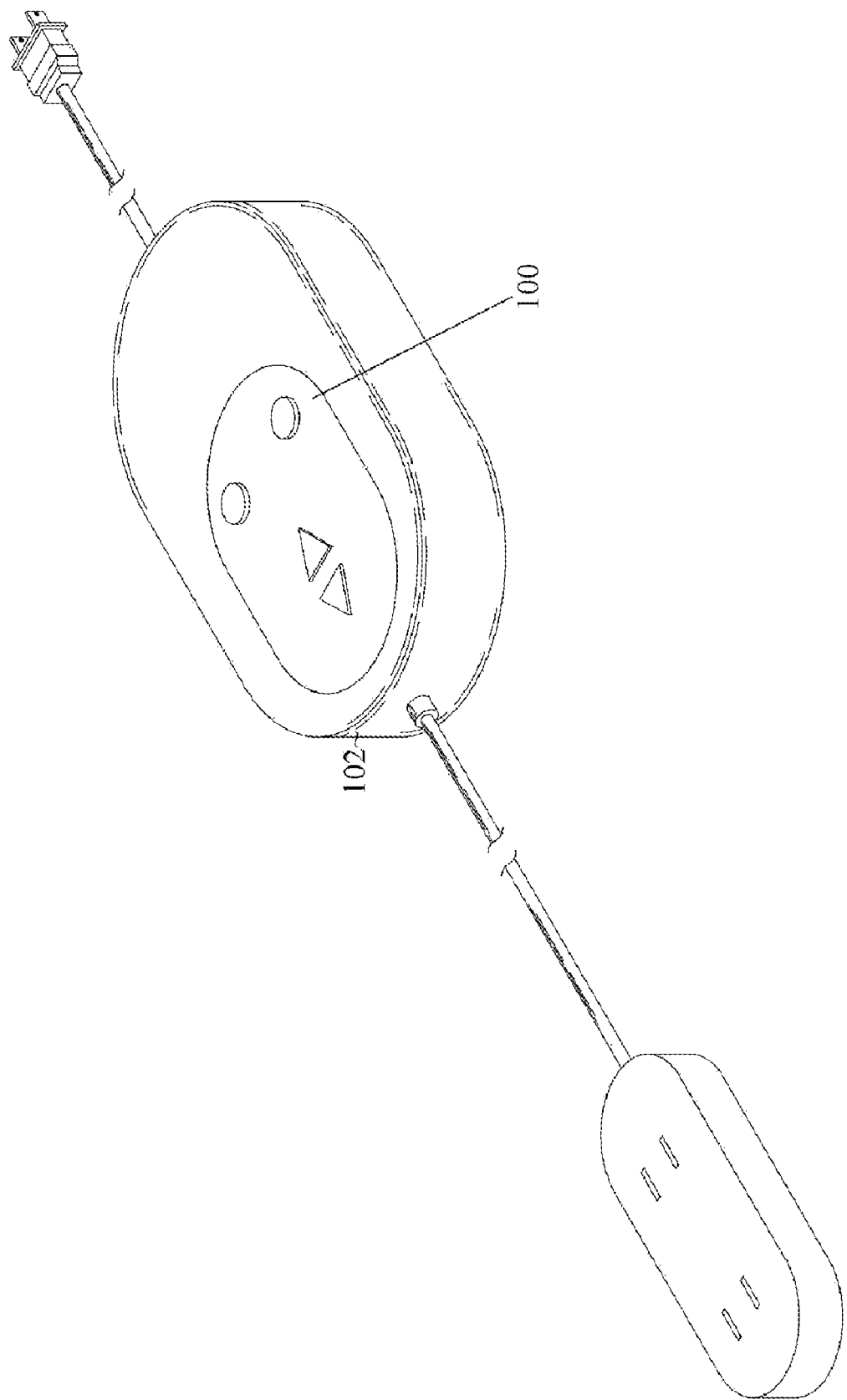
FIG. 4 is an orthogonal view of the remote control inserted inside the extension cord.

FIG. 4 is an orthogonal view of the remote control inserted inside the extension cord.

When the user is done operating the remote control unit 100, the operator may wish to secure the remote control unit 100 in the base 102 for safekeeping (which would prevent the remote control unit 100 from being lost). The hollow portion 101 (shown in FIG. 3) is sized and adapted to allow the remote control unit 100 to make a snug fit therein. The housing floor 103 (show in FIG. 3) is used to support the remote control unit 100 so that the remote control unit 100 cannot be inserted any deeper into the base 102. Once inserted, the remote control unit 100 would remain inside due to internal physical force, until removed by the operator.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An extension cord apparatus, the apparatus comprising:
   a plug connected to a first end of a cord;
   a base having no electrical function, the base attached to an intermediate portion of the cord, the base comprising a housing unit adapted to removably receive a remote control; and
   a plurality of extension sockets attached to a second end of the cord,
   wherein the remote control controls power to the plurality of extension sockets,
   wherein the base is a separate unit from the extension sockets, and the intermediate portion of the cord is located at a separate location between the first end and the second end.

2. The apparatus as recited in claim 1, wherein the housing unit comprising:
   a hollow portion in the base;
   a perimeter around the hollow portion; and
   a housing floor on a bottom of the hollow portion.

3. The apparatus as recited in claim 2, wherein the perimeter is shaped to snuggly fit the remote control so the remote control can be manually secured inside the housing unit and removed from the housing unit.

4. The apparatus as recited in claim 2, wherein the housing floor comprises a hole.

5. The apparatus as recited in claim 3, wherein the housing floor comprises a hole.

\* \* \* \* \*